US011875121B2

(12) United States Patent
Frost et al.

(10) Patent No.: US 11,875,121 B2
(45) Date of Patent: Jan. 16, 2024

(54) GENERATING RESPONSES FOR LIVE-STREAMED QUESTIONS

(71) Applicant: International Business Machines Corporation, Armonk, NY (US)

(72) Inventors: Keith Gregory Frost, Delaware, OH (US); Stephen Arthur Boxwell, Worthington, OH (US); Kyle Matthew Brake, Westerville, OH (US); Stanley John Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 17/334,680

(22) Filed: May 28, 2021

(65) Prior Publication Data

US 2022/0382988 A1    Dec. 1, 2022

(51) Int. Cl.
*G06F 40/30* (2020.01)
*G06N 20/00* (2019.01)
*H04L 51/02* (2022.01)

(52) U.S. Cl.
CPC .............. *G06F 40/30* (2020.01); *G06N 20/00* (2019.01); *H04L 51/02* (2013.01)

(58) Field of Classification Search
USPC ...................................................... 704/1–504
See application file for complete search history.

(56) References Cited

U.S. PATENT DOCUMENTS

| | | | |
|---|---|---|---|
| 7,249,117 B2 | 7/2007 | Estes | |
| 10,762,113 B2 | 9/2020 | Jia | |
| 10,776,582 B2 * | 9/2020 | Redmond | G06F 40/56 |
| 10,817,578 B2 | 10/2020 | Mandal | |
| 11,366,818 B2 * | 6/2022 | Allen | G06F 16/24575 |
| 11,403,345 B2 * | 8/2022 | Kim | G10L 15/1822 |
| 11,526,557 B2 * | 12/2022 | Wang | G06N 20/00 |
| 11,605,386 B2 * | 3/2023 | Lavi | H04L 51/02 |
| 11,610,063 B2 * | 3/2023 | Cougias | G06F 40/30 |
| 11,620,456 B2 * | 4/2023 | Silverstein | G06F 16/90332 704/9 |
| 11,641,404 B1 * | 5/2023 | Szczepański | H04L 67/1396 709/204 |
| 11,645,316 B2 * | 5/2023 | Qu | G06F 16/338 707/722 |
| 11,651,162 B2 * | 5/2023 | Gadde | H04L 51/02 704/9 |

(Continued)

FOREIGN PATENT DOCUMENTS

| | | |
|---|---|---|
| KR | 20080024752 A | 3/2008 |
| KR | 100818979 B1 | 4/2008 |
| KR | 101993771 B1 | 9/2019 |

OTHER PUBLICATIONS

Mell et al., "The NIST Definition of Cloud Computing", National Institute of Standards and Technology, U.S. Department of Commerce, NIST Special Publication 800-145, Sep. 2011, 7 pages.

*Primary Examiner* — Marcus T Riley
(74) *Attorney, Agent, or Firm* — David K. Mattheis

(57) ABSTRACT

Generating automated conversation responses by receiving a conversation input message, determining an intent associated with the conversation input message, detecting content associated with the intent in a data stream in response to determining the intent, and generating a conversation output according to the content and the intent.

20 Claims, 4 Drawing Sheets

(56) References Cited

U.S. PATENT DOCUMENTS

| | | | | |
|---|---|---|---|---|
| 11,657,096 B2* | 5/2023 | Hennig | ................ | H04L 51/216 |
| | | | | 704/9 |
| 11,657,810 B2* | 5/2023 | Jones | ................ | G06F 16/9532 |
| | | | | 704/275 |
| 11,662,888 B2* | 5/2023 | Yue | ................ | G06F 40/14 |
| | | | | 715/752 |
| 11,676,156 B2* | 6/2023 | Dunn | ................ | H04L 51/04 |
| | | | | 715/256 |
| 11,683,283 B2* | 6/2023 | Hansmann | ................ | G06N 3/09 |
| | | | | 709/206 |
| 11,689,486 B1* | 6/2023 | Bates | ................ | G06F 40/35 |
| | | | | 709/206 |
| 11,699,039 B2* | 7/2023 | Somech | ................ | G06F 16/248 |
| | | | | 704/9 |
| 2008/0147407 A1 | 6/2008 | Da Palma | | |
| 2015/0074112 A1 | 3/2015 | Liu | | |
| 2019/0005024 A1* | 1/2019 | Somech | ................ | G06F 16/243 |
| 2019/0027147 A1 | 1/2019 | Diamant | | |
| 2019/0034824 A1 | 1/2019 | Cagadas | | |
| 2019/0057157 A1 | 2/2019 | Mandal | | |
| 2019/0065498 A1 | 2/2019 | Yuan | | |
| 2019/0236205 A1 | 8/2019 | Jia | | |
| 2019/0260694 A1* | 8/2019 | Londhe | ................ | H04L 51/216 |
| 2019/0377790 A1* | 12/2019 | Redmond | ................ | G06F 40/205 |
| 2020/0159824 A1 | 5/2020 | Boxwell | | |
| 2020/0279002 A1* | 9/2020 | Kim | ................ | G10L 15/18 |
| 2020/0394366 A1* | 12/2020 | Miller | ................ | G06Q 50/01 |
| 2021/0157817 A1* | 5/2021 | Allen | ................ | H04L 51/046 |
| 2022/0382988 A1* | 12/2022 | Frost | ................ | G06N 5/01 |
| 2022/0405313 A1* | 12/2022 | Banipal | ................ | G06N 3/047 |

\* cited by examiner

GENERATING RESPONSES FOR LIVE-STREAMED QUESTIONS

FIELD OF THE INVENTION

The disclosure relates generally to automating question answering systems. The disclosure relates particularly to automatically generating responses to live-streamed questions.

BACKGROUND

Live-streamers provide entertainment for their audience by streaming audio and video of their activities in real-time while also taking and answering user questions about the activities using a direct messaging application running in parallel to the streaming or as part of the streaming application itself. Some streamers utilize chatbots for answering frequently asked questions from the chat.

Chatbots and other question answering systems receive and process user input to determine a user intent. These systems then use the determined intent together with a database of intent-response pairs, or a decision tree including defined intent—response nodes, to generate a response to the user. For frequently asked questions, a user may define specific intent-response pairings to provide answers without taking time away from their real-time actions to repeatedly answer the same question in the chat.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable automated responses for live-streamed questions.

Aspects of the invention disclose methods, systems and computer readable media associated with generating automated conversation responses by receiving a conversation input message, determining an intent associated with the conversation input message, detecting content associated with the intent in a data stream in response to determining the intent, and generating a conversation output according to the content and the intent.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
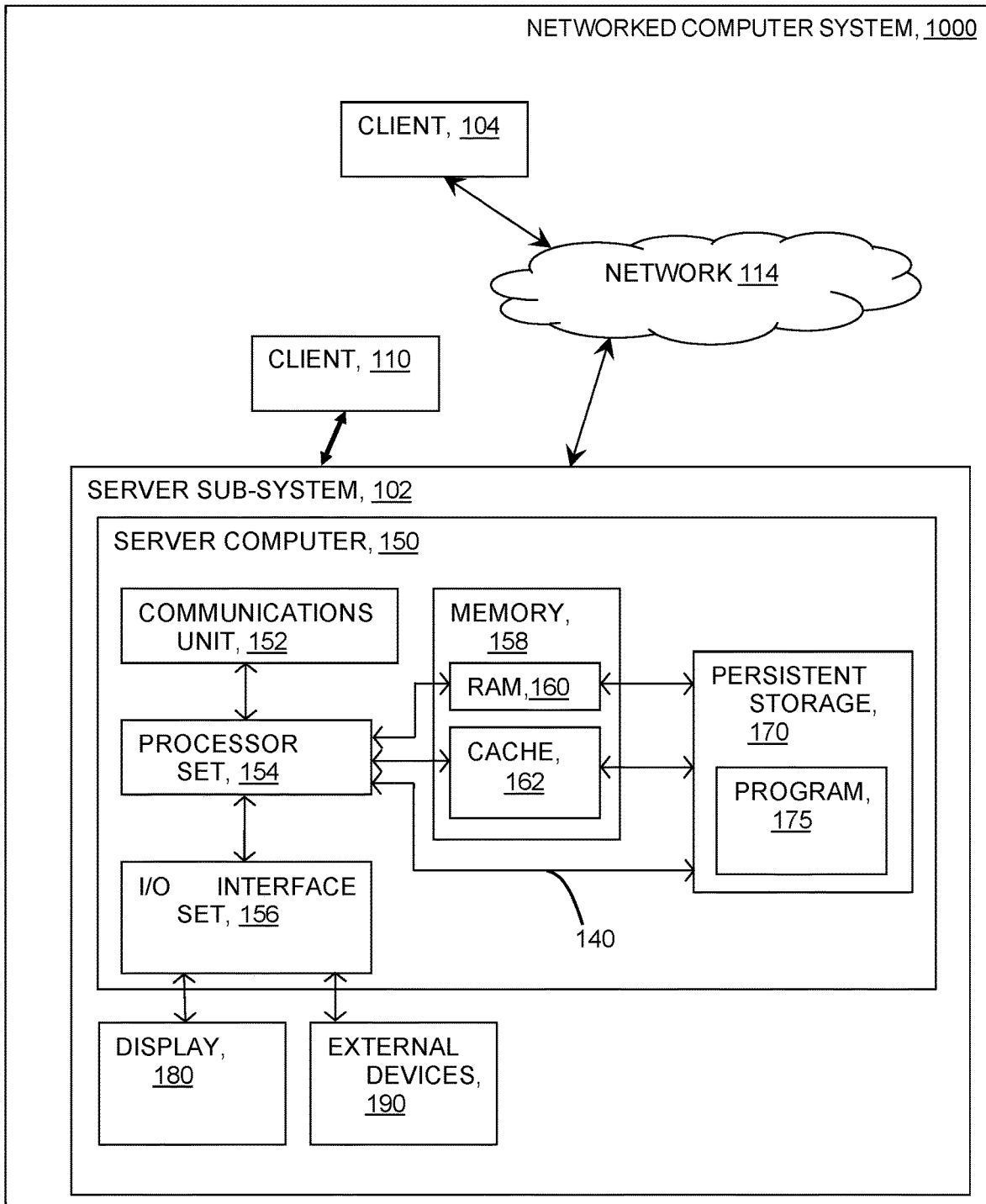
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Streamers often utilize chatbots to handle commonly asked audience questions. Unfortunately, these chatbot canned responses do not use contextual information about the stream to inform the response. Questions like 'What is that sound?' or 'Who is that?', made in reference to real-time audio or visual cues, cannot be answered in any meaningful way. Disclosed embodiments enable linking canned responses from the QA system to frequently occurring audio and visual elements from the presented streaming content.

Aspects of the present invention relate generally to question answering systems and, more particularly, to providing canned responses to questions regarding contemporaneous audio and visual elements of the stream, thereby reducing any need for the streamer to stop their other activities to address repetitive audience questions. In embodiments, a question answering (QA) system receives a question from a streaming audience member user device, determines one or more defined intents related to streaming content for the question, evaluates recent streaming content to identify elements associated with the defined intent(s), provides a prepared answer matched to the identified element(s) to the audience member. According to aspects of the invention, the QA system automatically and dynamically audio and visual streaming content and relates this content to intents of audience member questions. In this manner, implementations of the invention free the streamer from the need to alter the planned flow of their activities to answer frequently asked questions directed toward tangential rather than the main topics of the streaming content.

In accordance with aspects of the invention there is a method for automatically determining an audience member's intent in asking a question, in relating that intent to content of the streaming data, and in providing a preplanned answer to the audience member regarding the content in response to the question. Disclosed embodiments go beyond simply pairing a determined intent with a pre=planned answer by adding steps to identify potential streaming content related to the intent of the question, to then analyze recent and concurrent content to identify the presence of the related content and then to provide the answer related to the streaming content associated with the question.

Aspects of the invention provide an improvement in the technical field of QA systems. Conventional QA systems utilize intent—answer pairings based upon a corpus of knowledge and a response linked to an identified intent. Disclosed embodiments expand the corpus of knowledge to include defined content portions and to then validate the presence of specific content in streaming data and to provide the answer linked to the validated streaming content. In many cases, streamers know from experience the audio and visual cues which may appear in the stream and lead to predictable frequently asked questions. The known and predictable nature of the cues enable the streamer to prepare response to the questions which will arise when the cue presents. A single generalized question, such as "What was that sound?", may have any number of specific answers depending upon the audio context of the stream. Disclosed methods link the intent of the question to the various possible answers which are tied to the different possible content portions. In practice, the disclosed embodiments identify the underlying intent of the question, review the recent content, determine the most relevant context associated with the intent and provide the answer associated with that context. This provides the improvement of achieving a desired outcome for the user (i.e., providing answers to questions without distracting the streamer.

Aspects of the invention also provide an improvement to computer functionality. In particular, implementations of the invention are directed to a specific improvement to the way QA systems operate, embodied in the matching of an intent to specific cues present contemporaneous streaming content. In embodiments, the system monitors the presented stream of audio and video and identifies audio and video cues associated with pre-planned answers. When audience members raise the associated frequently asked question, the system matches the question to the identified cue and provides the pre-planned answer to the question. In this manner, embodiments of the invention affect how the QA system functions (i.e., the likelihood of providing a context relevant answer to a frequently asked question.

As an overview, a QA system is an artificial intelligence application executed on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator, such as a streamer, creates content in a document for use as part of a corpus of data with the QA system. The document may include any file, text, article, or source of data for use in the QA system. For example, a QA system accesses a body of knowledge about the domain, or subject matter area (e.g., financial domain, medical domain, legal domain, etc.) where the body of knowledge (knowledgebase) can be organized in a variety of configurations, such as but not limited to a structured repository of domain-specific information, such as ontologies, or unstructured data related to the domain, or a collection of natural language documents about the domain.

In an embodiment, one or more components of the system can employ hardware and/or software to solve problems that are highly technical in nature (e.g., receiving a conversation input message, determining an intent associated with the conversation input message, detecting content associated with the intent in a data stream in response to determining the intent, generating a conversation output according to the content and the intent, etc.). These solutions are not abstract and cannot be performed as a set of mental acts by a human due to the processing capabilities needed to facilitate generating contextually relevant answers to audience questions. Further, some of the processes performed may be performed by a specialized computer for carrying out defined tasks related to automatically answering questions. For example, a specialized computer can be employed to carry out tasks related to generating contextually relevant answers to questions, or the like.

In an embodiment, a system user, such as a content creating streamer, defines one or more intents associated with audio and visual elements commonly included in their streaming data. Elements may be added to the streaming data as environmental sounds picked up by the streamers microphone, or visual elements passing through the filed of view of the streamer's camera. Elements may include, without being limiting, audio from the streamers environment, such as a dog barking, nearby train noise, trolly noises, other traffic noises, neighborhood noises including children playing outside, an ice cream truck or just noisy neighbors audible through the walls of the streamers home, as well as audio cues commonly found in games being streamed. Visual element may include other residents of the home who may walk through the frame, friends, or pets who may appear from time to time in the video framing. Visual cues may also include elements from a streamed game, such as user interface elements, and game characters, the appearance of which has historically triggered a common question. Audience questions triggered by the elements may include: "What was that sound?", or "Who is that?", "What does that light mean?", etc. For each known cue, the user provides samples of the audio or visual cue together with pre-configured answers to the predictable questions. "Who is that?" may have context dependent answers such as "That's my husband", "That's my dog", "That's the Boss" etc., For the question "What is that noise?' answers may include "That the ice cream truck", "That's my neighbors", "That's the dog", etc.

In an embodiment, the method provides answers as text and as pre-recorded audio from the streamer/user setting up the system. Text data may be provided "as is" in response to a chatbot input, or may be provided as augmented audio to the streaming data using either the prerecorded audio answer, or a synthetic audio answer generated suing text t speech programming and a library of phonemes. In an embodiment, the method adds the augmented audio to the streaming data while detecting silence from the streamer. In an embodiment, the user provides the library of phonemes as samples of their voice. In this embodiment, the synthetic text to speech responses comprises strings of phonemes in the user's voice, reducing the synthetic sounding nature of the audio response.

In an embodiment, the method builds a matching database including sets of question intents, streaming data sample, and contextually relevant answers paired to both the intent and the specific streaming context data. As an example, the provided streaming data audio samples include recording of the streamers dog associated with the intent "What is that noise?' and the predefined answer "That's the dog". The method associates the intent, the samples and the answer as a set.

In an embodiment, the method assigns a common intent to multiple variations of a question according to the natural language processing. Questions such as "What was that sound?", "What is that noise", "What is that shrieking?", have a common intent seeking an answer about the nature of an audio element. Ambiguous questions, such as "What was that?" have intents relating to each of audio and video elements. For such ambiguous intents, the method analyses the streaming data for each of predefined audio and video elements and builds related decision tree child nodes for the possible individual audio elements, individual video elements and combinations of audio and video elements.

In an embodiment, the method defines, or trains, a decision tree for responding to the frequently asked questions. In an embodiment, the method defines a decision tree parent node for each defined intent for frequently asked or common conversation questions, together with child nodes relating to each provided streaming data sample potentially relevant to the intent of the parent node. In practice, the method receives a question and determines an intent. The method locates the intent within the decision tree and then identifies the child node associated with the audio or video element identified from the recent streaming data. The child node includes the response/answer to the common conversation question intent and identified element combination.

In an embodiment, during streaming, the method receives chatbot input, either audio data, speech to text transcription of audio data, or text input from an audience member. The method analyzes the chatbot input data using a natural language processing algorithm, or similar algorithm, to determine an intent associated by the chatbot data. In this embodiment, the method matches the determined intent to the associated audio and/or video samples matched to the intent. The method scans the recent audio and video streaming data to identify the presence of any of the samples associated with the intent. A single broad intent may be associated with a variety of different audio or visual samples.

In an embodiment, the method trains one or more machine learning classification models for the purpose of classifying the recent audio and video cues according to the provided audio and video samples associated with an underlying intent. As an example, the method trains a neural network such as an Deep neural network, or recurrent neural network, or a generative network such as a generative adversarial network or variational autoencoder, to classify new audio and visual cue data as predefined audio and visual elements associated with particular intents. In this embodiment, the method provides the recent streaming data to the trained model and the model provides a classification of the audio and/or video cues identified as present in the streaming data.

In an embodiment, the method continuously provides the current streaming data to the trained classification model(s) which in turn provide an ongoing stream of predefined audio and visual elements identified in the streaming data. In this embodiment, the method tracks the presence of the audio and visual elements in the streaming data and matches the most recent elements to the intent when questions are presented. The method tracks time stamps for identified elements and presented questions. In an embodiment, the method scans identified elements having time stamps corresponding to a defined time interval, such as ten seconds, prior to the time stamp of the presented question.

In an embodiment, the method retains recent streaming data, for example the past thirty seconds of streaming data, in a buffer. After a question is asked, the method determines an intent, matches the intent to possible data samples, and then analyzes the stored streaming data using the classification models to identify the presence of a relevant audio or visual element.

After identifying an audio and/or visual element relevant to the determined intent associated with a question, the method matches the combined intent and identified element to a predefined response to the question, and provides the response as an answer to the question. The response may be provided as text in a text-based chat application, or as speech by utilizing text to speech programming, or by playing a response recorded by the streamer for the particular combination of question intent and matched element sample.

As an example, a streamer has noisy neighbors who can be heard during streaming sessions. Rather than constantly taking time away from streaming to discuss the neighbors, the streamer creates an intent for questions relating to noise—"What is that screaming?", etc. The streamer records samples of the neighbors and uses them as labeled training data for the classification model and the decision tree. The streamer records a predefined response "That's just my noisy neighbors" for the combination of "What is that noise?" or anything similar within conversation input messages, and contemporaneous audio data from the stream matching or classified as the noisy neighbors. During streaming, when a user asks the predicted question in response to the neighbors activities, the method of the invention matches the audio of the neighbors with the sampled audio, determines the intent relating to identifying a recent sound, and provides the prerecorded response as output to the user by adding the response to the audio of the streaming data when the user is not speaking, or by providing a speech to text response via a streaming chatbot.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise response generation program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the response generation program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., response generation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
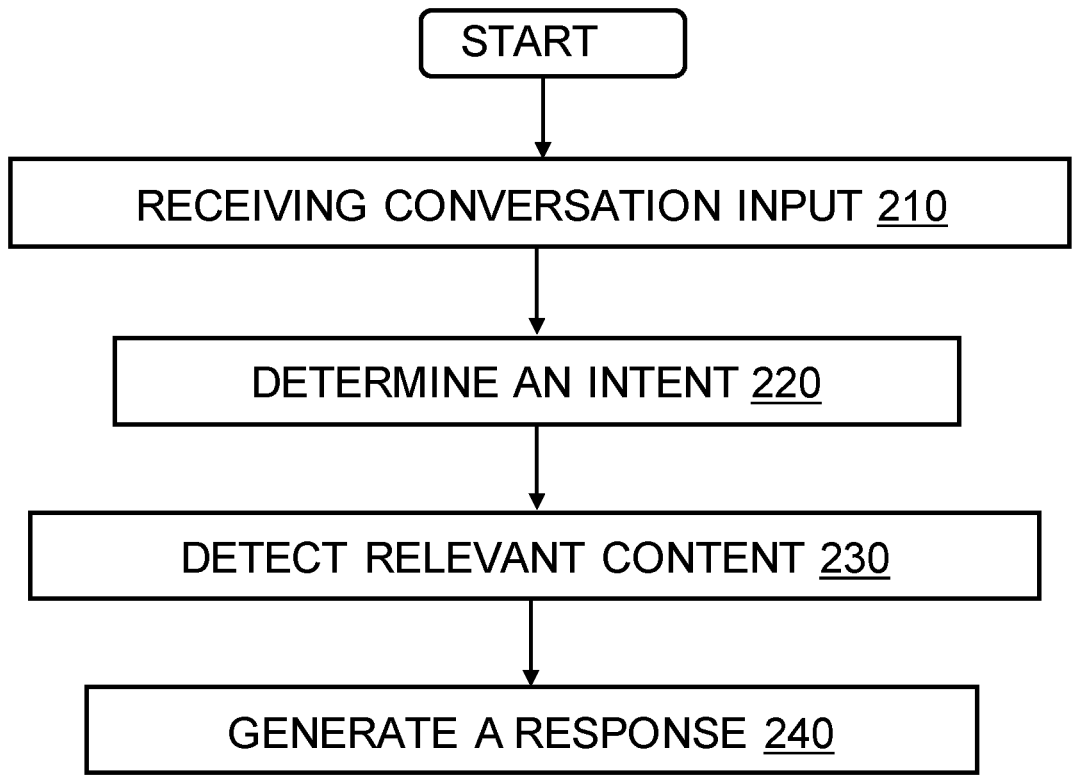
FIG. 2 provides a flowchart depicting an operational sequence, according to an embodiment of the invention.

FIG. 2 provides a flowchart 200, illustrating exemplary activities associated with the practice of the disclosure. After program start, at block 210, the method of the response generation program 175, executing through one of more processors of the computing environment illustrated in FIG. 1, receives conversation input from a device such as the computing device of an audience member. The conversation input message may include a predictable question asked by the audience member in response to seeing or hearing something presented as part of a streaming data from a user. The conversation input message may be in the form of an audio data file, text data entered directly by the audience member in a chatbot window, or speech to text data provided after a conversion of the audience member's audio input to text by one of the audience member's device or the user's device/

At block 220, the method determines an intent for the conversation input message using natural language processing or similar algorithms. The intent may be a new intent, a known intent having no pre-defined responses, or a known intent having matching pre-defined responses in defined decision tree. For known intents having pre-defined responses in a decision tree, the method identifies one or more audio or video elements contextually relevant to the determined intent. A single known intent may be associated with multiple possible contextually relevant audio and/or video elements.

At block 230, the method scans streaming data and identifies audio and/or video elements contextually relevant to the intent associated with the conversation input message. In an embodiment, the method continuously scans the streaming data and tracks all identified pre-defined audio and video elements to associated with intents as audience members poise questions. In an embodiment, the method buffers streamlining data and scans the buffered data for specific audio and/or video elements relevant to an identified conversation input message intent. In an embodiment, the method time stamps identified pre-defined audio and video elements associated with intents and compares those time stamps to a time stamp associated with new conversation input messages containing a pre-defined intent.

At block 240, the method generates a response to the combination of the determined intent for the conversation input message and the recent pre-defined audio and/or video elements identified in the streaming data and considered contextually relevant to the determined intent. In an embodiment, the method uses a trained decision tree to generate the response to the conversation input message. In this embodiment, the method scans the decision tree for the parent node associated with the determined intent and then finds the child node of that parent node which is associated with the identified contextually relevant audio and/or video element found in the streaming data. The child node includes the pre-defined response for the combination of the intent and audio and/or video element. The response may be text data or an audio file. The audio file may be a recording of the user's voice reciting the response, or a sequence of phonemes composed to recite the text using text to speech programming. The string of phonemes my be taken from a phoneme dictionary and may include synthetic phonemes as well as phonemes recorded by the user/streamer for use in compiling response to questions.

The method provides the response form the child node to the audience member over a communication network to the audience member's device, or by augmenting the streaming data with a generated audio response version of the response, or by adding a text response to a chatbot application running as part of the overall streaming interface.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
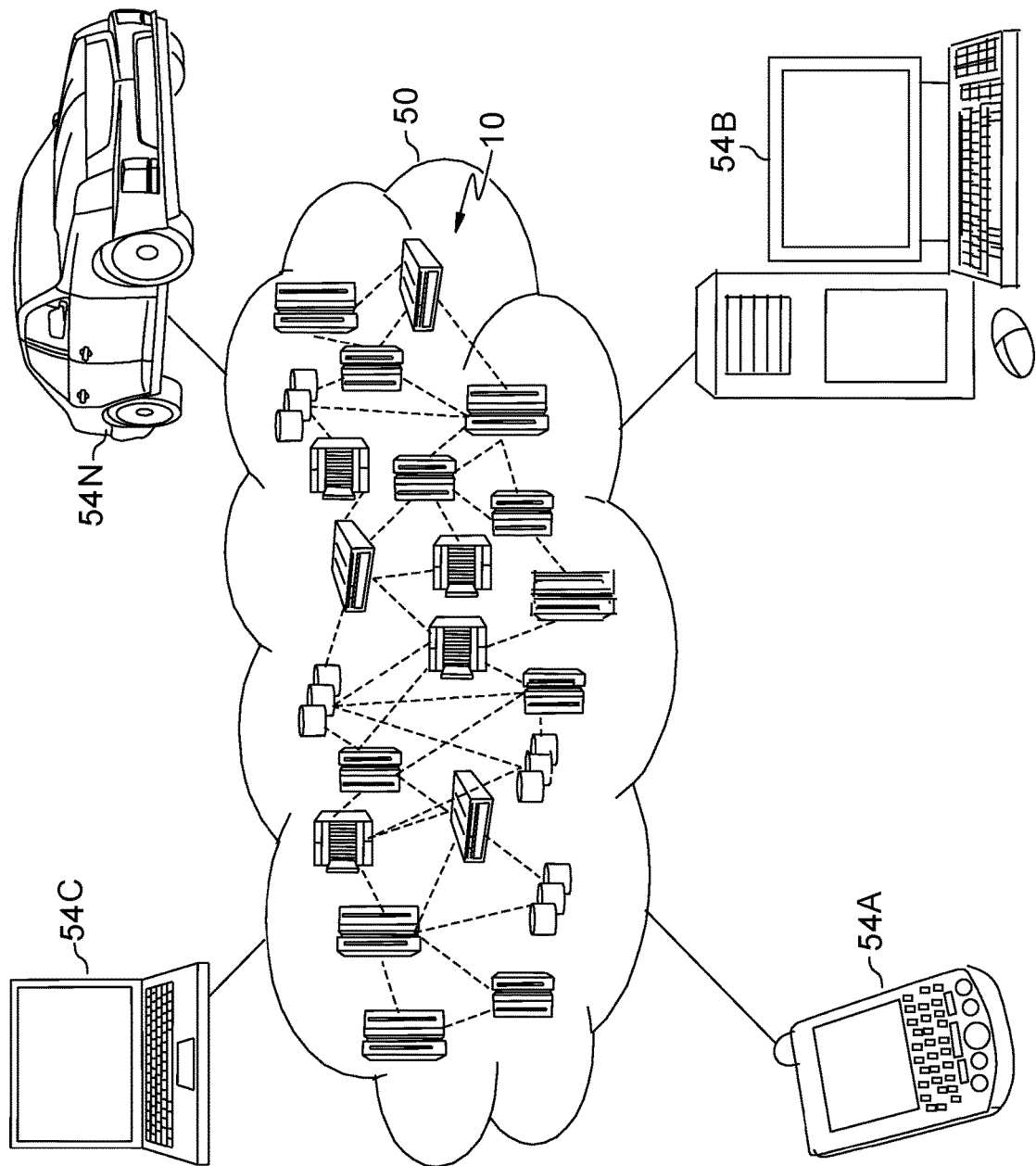
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
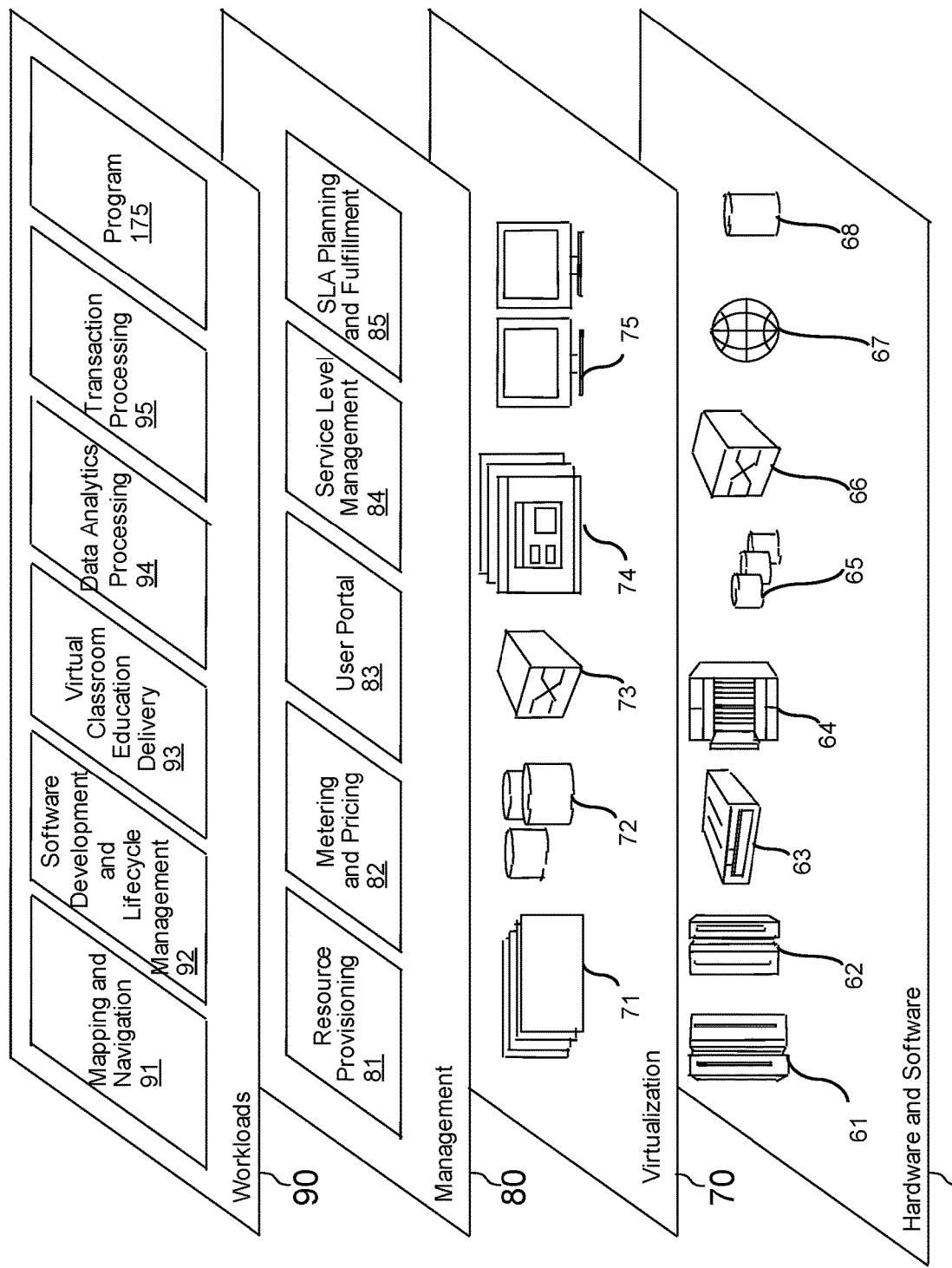
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and response generation program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating automated conversation responses, the method comprising:
   receiving, by one or more computer processors, a conversation input message;
   associating, by the one or more computer processors, a first time stamp with the conversation input message:
   determining, by the one or more computer processors, an intent associated with the conversation input message:
   responsive to determining the intent, detecting, by the one or more computer processors, content associated with the intent in a data stream;
   associating, by the one or more computer processors, a second time stamp with the content;
   comparing, by the one or more computer processors, the first time stamp and the second time stamp; and
   generating, by the one or more computer processors, a conversation response according to the intent and content recent to the intent according to the first time stamp and the second time stamp.

2. The method according to claim 1, wherein generating the conversation response according to the content comprises utilizing a decision tree associated with the intent.

3. The method according to claim 1, further comprising:
   defining, by the one or more computer processors, a decision tree according to the intent, wherein the decision tree comprises a node;
   training, by the one or more computer processors, the decision tree using a common conversation input message;
   training, by the one or more computer processors, the decision tree using data stream samples; and
   defining, by the one or more computer processors, a conversation output message of the node according to the common conversation input message and the data stream samples.

4. The method according to claim 1, wherein the data stream comprises data selected from a group consisting of audio data, speech to text transcription of audio data, or text input data from an audience member, and combinations thereof.

5. The method according to claim 1, wherein the conversation input message comprises a question.

6. The method according to claim 1, wherein a conversation output message comprises an answer to a question.

7. The method according to claim 1, further comprising:
   defining, by the one or more computer processors, a decision tree associated with a defined intent, wherein the decision tree comprises a node and wherein the conversation input message comprises a question associated with the defined intent;
   training, by the one or more computer processors, the decision tree using a common conversation input message;
   training, by the one or more computer processors, the decision tree using data stream samples; and
   defining, by the one or more computer processors, a conversation output message of the node according to the common conversation input message and the data stream samples; wherein the conversation output message comprises an answer to the question.

8. A computer program product for generating automated conversation responses, the computer program product comprising one or more computer readable storage medium and collectively stored program instructions on the one or more computer readable storage medium, the stored program instructions comprising:
   program instructions to receive a conversation input message;
   program instructions to associate a first time stamp with the conversation input message:
   program instructions to determine an intent associated with the conversation input message:
   program instructions to detect content associated with the intent in a data stream in response to determining the intent;
   program instructions to associate a second time stamp with the content;
   program instructions to compare the first time stamp and the second time stamp; and
   program instructions to generate a conversation response according to the intent and content recent to the intent according to the first time stamp and the second time stamp.

9. The computer program product according to claim 8, wherein generating the conversation response according to the content comprises utilizing a decision tree associated with the intent.

10. The computer program product according to claim 8, the stored program instructions further comprising:

program instructions to define a decision tree according to the intent, wherein the decision tree comprises a node;

program instructions to train the decision tree using a common conversation input message;

program instructions to train the decision tree using data stream samples; and program instructions to define a conversation output message of the node according to the common conversation input message and the data stream samples.

11. The computer program product according to claim 8, wherein the data stream comprises data selected from a group consisting of audio data, speech to text transcription of audio data, or text input data from an audience member, and combinations thereof.

12. The computer program product according to claim 8, wherein the conversation input message comprises a question.

13. The computer program product according to claim 8, wherein a conversation output message comprises an answer to a question.

14. The computer program product according to claim 8, the stored program instructions further comprising:

program instructions to define a decision tree associated with a defined intent, wherein the decision tree comprises a node and wherein the conversation input message comprises a question associated with the defined intent;

program instructions to train the decision tree using a common conversation input message;

program instructions to train the decision tree using data stream samples; and program instructions to define a conversation output message of the node according to the common conversation input message and the data stream samples;

wherein the conversation output message comprises an answer to the question.

15. A computer system for generating automated conversation responses, the computer system comprising:

one or more computer processors;

one or more computer readable storage medium; and stored program instructions on the one or more computer readable storage medium for execution by the one or more computer processors, the stored program instructions comprising:

program instructions to receive a conversation input message;

program instructions to associate a first time stamp with the conversation input message:

program instructions to determine an intent associated with the conversation input message:

program instructions to detect content associated with the intent in a data stream in response to determining the intent;

program instructions to associate a second time stamp with the content;

program instructions to compare the first time stamp and the second time stamp; and program instructions to generate a conversation response according to the intent and content recent to the intent according to the first time stamp and the second time stamp.

16. The computer system according to claim 15, wherein generating the conversation response according to the content comprises utilizing a decision tree associated with the intent.

17. The computer system according to claim 15, the stored program instructions further comprising:

program instructions to define a decision tree according to the intent, wherein the decision tree comprises a node;

program instructions to train the decision tree using a common conversation input message;

program instructions to train the decision tree using data stream samples; and program instructions to define a conversation output message of the node according to the common conversation input message and the data stream samples.

18. The computer system according to claim 15, wherein the data stream comprises data selected from a group consisting of audio data, speech to text transcription of audio data, or text input data from an audience member, and combinations thereof.

19. The computer system according to claim 15, wherein a conversation output message comprises an answer to a question.

20. The computer system according to claim 15, the stored program instructions further comprising:

program instructions to define a decision tree associated with a defined intent, wherein the decision tree comprises a node and wherein the conversation input message comprises a question associated with the defined intent;

program instructions to train the decision tree using a common conversation input message;

program instructions to train the decision tree using data stream samples; and program instructions to define a conversation output message of the node according to the common conversation input message and the data stream samples;

wherein the conversation output message comprises an answer to the question.

\* \* \* \* \*